United States Patent Office 3,384,420
Patented May 21, 1968

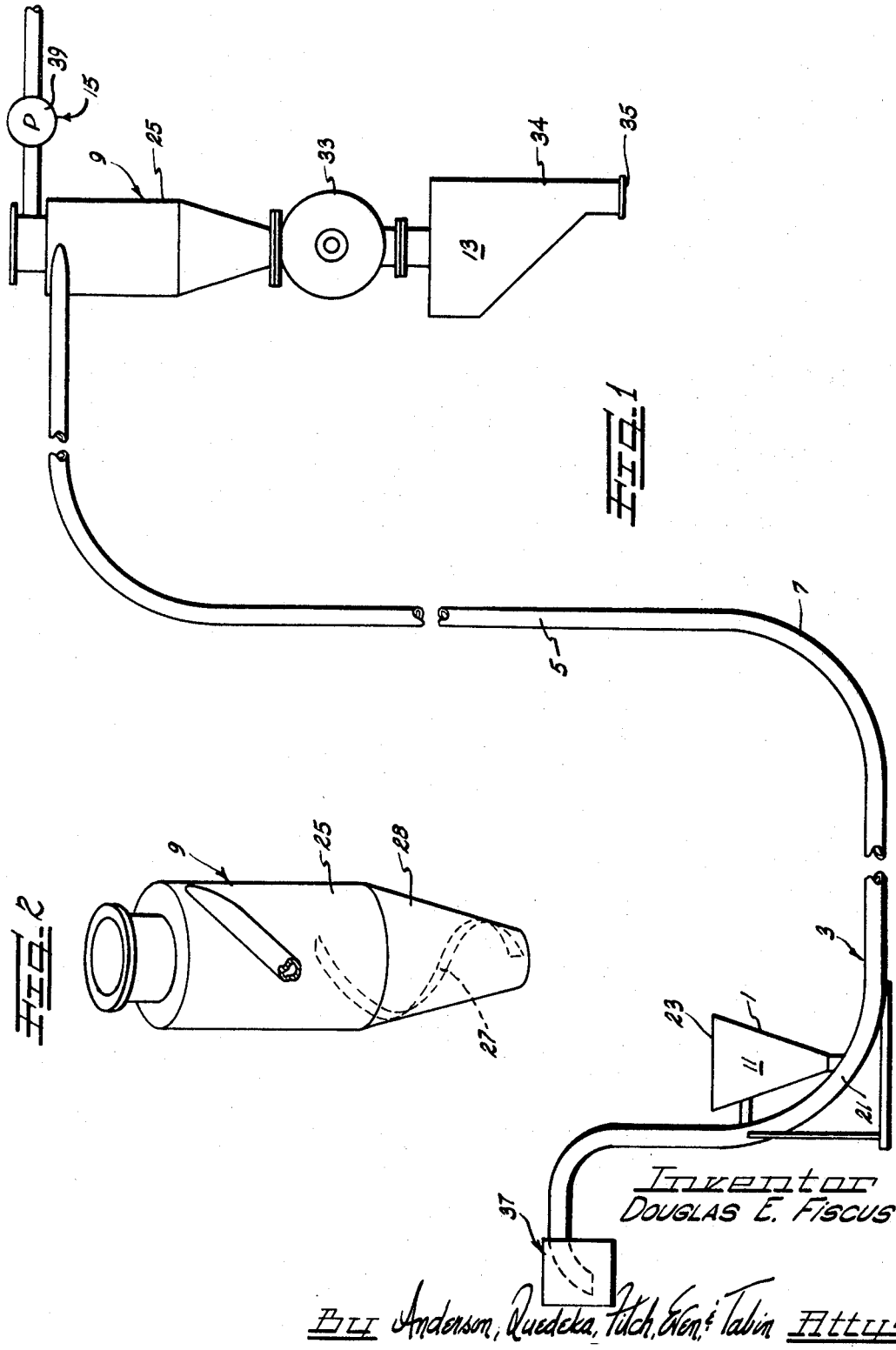

3,384,420
TRANSFER SYSTEM
Douglas E. Fiscus, Burnsville, Minn., assignor to Cargill, Incorporated, Wilmington, Del., a corporation of Delaware
Filed Aug. 2, 1966, Ser. No. 569,737
1 Claim. (Cl. 302—17)

ABSTRACT OF THE DISCLOSURE

A transfer system for transferring samples of particulate material from a sampling station to an inspection room. The transfer system is adapted to deliver all of the sample to the inspection room without damaging the sample. The transfer system includes a hopper for receiving the particulate material, an air conveying conduit system and a cyclone separator which separates the particulate material from the air stream. The cyclone separator is designed for the particular air flow conditions and product conveyed so as to insure complete separation of the particulate material from the air stream.

---

The present invention relates generally to a method and apparatus for transferring samples of particulate material. More particularly, the present invention is concerned with a method and apparatus for delivering samples of particulate material without appreciable damage and with greater facility.

Certain classes of granular material including grains, seeds, meals, flours, and other finely divided materials, hereinafter referred to generally as particulate material, are bought and sold on the basis of grading. Grades are established through analysis of representative samples which tell an interested party the quality of the grain through an evaluation of such factors as bulk density, moisture content, or degree of damage to the particulate material, where pertinent. Grading, of course, necessitates taking a representative sample of the particulate material for inspection. Various devices are used for taking such samples from either a moving flow of the grain or from a static mass of the grain.

Whatever the method for extracting a sample of the particulate material from the total mass of material available, it is usually necessary to transport such sample to a central location or inspection room wherein the grading takes place. In the past, such samples from a sampling device have been collected in a location in close proximity to the sampling device and thereafter manually transported to an inspection room. However, since the inspection room is generally at some distance from the sampling device, and the sample may often be of considerable size, the transportation of such samples involves time and effort. Also, it has been the practice for the purpose of good sampling to place mechanical sampling devices in such locations as pits, tunnels or spouts underneath machinery or extending outside of buildings wherein a moving stream of the grain may be sampled. Such locations, however, are relatively inacessable and hazardous to a workman for collecting such samples. Accordingly, mechanical sampling devices have not been placed in such locations.

Various grain sample delivery systems have been proposed in the past for transferring samples from the sampling device to the inspection room. Such prior art delivery systems have included conveying belts and pressurized air conveyors. Such prior art samples delivery methods, however, have not worked out well for various reasons, including damage to the sample being transferred, inability to deliver all of the samples from the sampling device to the inspection room, or non-uniform sampling. It will be readily apparent that delivery of a proper sample from the sampling device to the inspection room is of extreme importance in that a representative sample is necessary for proper grading.

Accordingly, it is the principal object of the present invention to provide an improved sample delivery system. It is another object of the present invention to reduce the time needed to convey representative samples. It is a further object of the present invention to provide an improved sample delivery system which delivers representative samples to desired locations. It is yet another object of the present invention to provide an improved sample delivery system wherein all of the sample introduced into the system is delivered to a desired location.

These and other objects of the present invention will become more apparent from a careful reading of the following detailed disclosure and the accompanying drawing wherein:

FIGURE 1 is a schematic representation of the flow sheet illustrating apparatus of the present invention and, FIGURE 2 is a perspective view of apparatus used in the apparatus of the present invention shown in FIGURE 1.

Generally, in accordance with the present invention, particulate material from a mechanical sampling device enters an inlet hopper 1. The hopper 1 is designed so as to meter the grain into a conveyor, comprising a tubular conduit system 3, in such a manner that the tubular conduit system 3, does not overflow and plug. An air stream is swept through the tubular conduit system 3 which conveys the sample through lengths of straight tubular conduit 5 and large sweeping conduit bends 7 to a separator 9 which separates the particulate material from the air stream. The separator 9 is designed for the particular air flow and product conveyed so as to assure complete separation of the particulate material from the air and complete discharge of the material from the separator 9.

Now referring particularly to FIGURE 1, there is shown a flow sheet of apparatus suitable for practice of the present invention. In the flow sheet there is provided an input station 11, a collection station 13, and a vacuum producing station 15. The input station 11 and the collection station are in fluid communication thru tubular conduit system 3.

The input station 11 includes the hopper 1 which discharges into a bend section 21 of the tubular conduit system 3. The hopper 1, as shown in FIGURE 1, has a frusto-conical configuration to facilitate removal of the sample which is loaded into the top opening 23 of the hopper 1. Although other configurations with sloping sides, such as various frusto-polyhedral shapes, are considered suitable for hopper configuration, the frusto-conical configuration is considered most desirable.

Since the pressure differential for moving the sample of particulate material through the tubular conduit system 3 is most desirably provided by means of vacuum, as will be discussed more fully hereinafter the hopper 1 may be provided with means (not shown) for preventing air from being drawn through the hopper 1 and into the tubular conduit system 3. Such means may comprise a closure for the top opening 23 of hopper 1. Other suitable means for preventing such air flow through the hopper include a rotary air lock (not shown) at the base of hopper 1. Such air lock, when desirable, may also be used to positively meter the sample continuously into the bend section 21 of the tubular conduit system 3.

The particulate material is introduced into the bend section 21 of the tubular conduit system 3 at a point at which the conduit inclines in a downwardly direction from the point of introduction of the material. This permits at least a part of the initial velocity of the individual particles of particulate material to be derived from gravity and prevents individual particles from falling directly to the bottommost surface of the conduit and remaining within the conduit while the remaining sample is transferred through the conduit system 3. This features is important in insuring that all of the sample is transferred to the inspection room to prevent erroneous grading.

It has been determined that a desirable point of introduction of the sample into the bend section 21 is at the mid-point of a quarter circle bend in the tubular conduit. This permits vertical orientation of the hopper 1.

Removal of the sample from the tubular conduit system 3 is effected at collection station 9. As shown in FIGURE 1, a preferred method of removal of the sample is by means of a cyclone separator 25. Although other means of sample removal, such as mesh filters, are possibly used, a cyclone separator is preferred due to its adaptability to continuous operation and its facility in handling particulate materials without damage.

The cyclone separator 25 of this invention is designed to ensure complete separation of the particulate material from the conveying air stream and complete discharge from the cyclone of all particulate material entering. In this connection, it is a known phenomena in cyclone separators for a portion of separated particulate material to remain whirling around the periphery of the separator at the end of a run. To prevent this phenomena from occuring, a spiral baffle 27, as shown in FIGURE 2, is located along the inner periphery of cyclone separator 25 at the outlet end. This baffle, which is angularly disposed with respect to the wall of the cyclone separator 25, prevents particulate material from riding up the inner wall and repeatedly whirling. The baffle 27 is welded or otherwise permanently affixed to the inner wall in a manner to prevent cracks between the baffle 27 and the inner wall of the cyclone. The pitch of the spiral is adjusted to the velocity of the air stream in the conduit system 3, and is a function of the size of the discharge section 28 of the separator 25.

A rotary air lock 33 is provided to permit continuous discharge of the sample into the collection station 13. The collection station 13, as shown in the drawings, comprises a hopper 34 having an outlet 35.

The cyclone separator 25 is designed specifically for particular air flow conditions and particulate materials. In this connection, it is desired to maintain an air velocity of from between about 3200 feet per minute and about 3600 feet per minute in the tubular conduit system 3. At air velocities below about 3200 feet per minute, it is difficult to maintain movement of the particulate material within the tubular conduit system 3. At velocities above about 3600 feet per minute the particulate material is subject to undue abrasion from turbulent flow conditions. Under these air flow conditions, the separator has a diameter of 10 inches and discharges through an outlet having a diameter of 4½ inches. The outlet tapers and the slope is 75 degrees. The pitch of the baffle 27 is about ⅜ inch per inch. The distance from the tubular section to the outlet section 28 is about 10 inches.

To further prevent abrasion of the particulate material, the tubular conduit system 3 is designed with the straight sections 5 and curved conduit bends 7 rather than angular joints. The radius of curvature of the conduit bends 7 is greater than about 14 inches and preferably is about 18 inches.

The air stream in the tubular conduit system 3 is established between an air inlet station 37 provided at the inlet end of the tubular conduit system 3 ahead of the input station 11 and a vacuum pump 39 which connects to the cyclone separator 25. The air inlet station 37 is provided with suitable screening material to prevent undesirable particulate material from contaminating the samples.

The air flow within the tubular conduit system 3 which sweeps the particulate material from the hopper 1 to the cyclone separator 25 is provided by the vacuum pump 39, although an air flow within the desired suitable velocity limits of from about 3200 to about 3600 feet per minute may be provided by a positive pressure blower. This permits location of the air flow producing means at the collection station end of the sample delivery system rather than at the input station end which may be located in a relatively inaccessable area.

The following example further illustrates various features of the present invention but is intended to in no way limit the scope of the application which is defined in the appended claims.

A mass of wheat which was being moved on a conveyor belt was sampled at periodic intervals by an automatic sampling device. The sample of wheat was discharged into hopper 1 of the present invention which was a frusto-conical shape, 10 inches in diameter at the top, 2 inches in diameter at the bottom and 12 inches high. The sample was discharged into the hopper at a rate sufficient to maintain the hopper about half full. The hopper discharged into a vertically oriented curved section of 2 inch outside diameter, 16 gauge stainless steel conduit. The conduit was curved with an 18 inch radius quarter circle and the hopper discharged into the conduit at a point that was halfway along the curved portion. This point is about 5 inches above the bottommost portion of the curved section of conduit to provide an initial gravity acceleration to particles of wheat entering the conduit.

The particles of wheat are then conveyed through a 2 inch outside diameter, 16 gauge stainless steel conduit by an air flow of 3600 feet per minute to a cyclone separator. 18 inch radius bends are used for any direction changes required in the conduit.

The cyclone separator has a diameter of 10 inches, a cylindrical middle section 14 inches long, a frusto-conical lower section that tapers from 10 inches at the top to 4½ inches at the bottom. The bottom of the cyclone separator is provided with a rotary air lock for continuous discharge of the sample.

A spiral baffle was welded to the inner periphery of the frusto-conical section of the cyclone separator. The spiral had a ⅜ inch pitch, was one inch wide and was located at an angle of 45° with respect to the conical wall of the cyclone separator.

All of the sample of wheat was delivered from the mechanical sampling device to the inspection room by means of the described delivery system with no damage to the sample. There was no holdup of any portion of the sample within the system.

It is apparent that various modifications and changes may be made from the above described particular embodiment of the invention without departing from the scope of the invention as contained in the following claim.

What is claimed:

1. A transfer system for particulate materials wherein all of the particulate material is completely transferred to a desired location without change in condition or damage to the particulate material which comprises: an inlet hopper, a cyclone separator, a tubular conduit connecting said hopper and said cyclone separator, and air stream producing means, said hopper being positioned so that particulate material discharged therefrom into said tubular conduit is provided a partial initial velocity from gravity, said tubular conduit having curved bends, and said cyclone separator being provided with means for insuring discharge of all particulate material, said means for insuring discharge of all particulate material from said cyclone separator being a spiral baffle, said spiral baffle being located along the inner periphery of said cyclone separator at the outlet end.

References Cited

UNITED STATES PATENTS

| | | | |
|---|---|---|---|
| 810,989 | 1/1906 | Steinert | 302—17 |
| 1,514,248 | 11/1924 | Bergman | 302—17 |
| 2,010,231 | 8/1935 | Heist | 302—59 |

ANDRES H. NIELSEN, *Primary Examiner.*